United States Patent
Nagura (10) Patent No.: US 8,601,274 B2
(45) Date of Patent: Dec. 3, 2013

(54) INTER-VEHICLE COMMUNICATION SYSTEM

(75) Inventor: Michinaga Nagura, Kariya (JP)

(73) Assignee: DENSO CORPORATION, Kariya (JP)

(*) Notice: Subject to any disclaimer, the term of this patent is extended or adjusted under 35 U.S.C. 154(b) by 20 days.

(21) Appl. No.: 13/091,169

(22) Filed: Apr. 21, 2011

(65) Prior Publication Data

US 2011/0261890 A1    Oct. 27, 2011

(30) Foreign Application Priority Data

Apr. 22, 2010    (JP) ................ 2010-098951

(51) Int. Cl.
H04L 9/32    (2006.01)
(52) U.S. Cl.
USPC .................................. 713/179; 173/180
(58) Field of Classification Search
None
See application file for complete search history.

(56) References Cited

U.S. PATENT DOCUMENTS

| | | | | |
|---|---|---|---|---|
| 4,110,558 | A * | 8/1978 | Kageyama et al. | 375/357 |
| 4,803,725 | A * | 2/1989 | Horne et al. | 380/44 |
| 6,411,716 | B1 * | 6/2002 | Brickell | 380/286 |
| 6,426,693 | B1 * | 7/2002 | Inomata | 340/539.21 |
| 6,731,755 | B1 * | 5/2004 | Cocks | 380/30 |
| 7,136,489 | B1 * | 11/2006 | Madhusudhana et al. | 380/277 |
| 7,181,615 | B2 * | 2/2007 | Fehr et al. | 713/156 |
| 7,187,771 | B1 * | 3/2007 | Dickinson et al. | 380/228 |
| 7,466,444 | B2 * | 12/2008 | Silverbrook et al. | 358/1.18 |
| 8,108,691 | B2 * | 1/2012 | Holtzman et al. | 713/193 |
| 2005/0182710 | A1 * | 8/2005 | Andersson et al. | 705/39 |
| 2006/0153189 | A1 * | 7/2006 | Nitou | 370/389 |
| 2009/0106219 | A1 * | 4/2009 | Belknap et al. | 707/4 |

FOREIGN PATENT DOCUMENTS

| | | |
|---|---|---|
| JP | 2005-051734 | 2/2005 |
| JP | 2005-323003 | 11/2005 |
| JP | 2006-174179 | 6/2006 |
| JP | 2006-22738 | 8/2006 |
| JP | 2007-088737 | 4/2007 |
| JP | 2008-060789 | 3/2008 |
| JP | 2008-060809 | 3/2008 |
| JP | 2009-081524 | 4/2009 |

OTHER PUBLICATIONS

IEEE Std 1609.2™-2006.*
Strasser et al. (" Efficient Uncoordinated Fhss Anti-jamming Communication,", MobiHoc'09, May 18-21, 2009).*
Leinmuller et al. (Improved Security in Geographic Ad hoc Routing through Autonomous Position Verification, Vanet'06, Sep. 29, 2006).*
Perrig et al. (Efficient Authentication and Signing of Multicast Streams over Lossy Channels, 2000).*

* cited by examiner

Primary Examiner — Saleh Najjar
Assistant Examiner — Oleg Korsak
(74) Attorney, Agent, or Firm — Posz Law Group, PLC (57) ABSTRACT

A communication system for transmitting and receiving communication data together with signature data attached thereto for verifying the communication data. A transmission-side in-vehicle device of the system generates the signature data for each unit of communication data consisting of M pieces of communication data, and transmits the M pieces of divided signature data, attached to M corresponding pieces of communication data. A reception-side in-vehicle device of the system reconstitutes each unit of communication data from M pieces of received communication data, reconstitutes the signature data from M pieces of received divided signature data, and verifies the reconstituted unit of communication data with the reconstituted signature data. This can prevent significant increase in data amount of additional data in each communication frame for verifying the communication data.

12 Claims, 6 Drawing Sheets

INTER-VEHICLE COMMUNICATION SYSTEM

CROSS-REFERENCE TO RELATED APPLICATION

This application is based on and claims the benefit of priority from earlier Japanese Patent Application No. 2010-98951 filed Apr. 22, 2010, the description of which is incorporated herein by reference.

BACKGROUND

1. Technical Field of the Invention

This invention relates to a communication system for transmitting and receiving communication data together with signature data attached thereto for verifying the communication data.

2. Related Art

In recent years, there has been considered introduction of a system that is operative to exchange vehicle information about one's own vehicle, such as a vehicle location, a vehicle velocity, a travelling direction, and ON/OFF operation of a brake, with peripheral vehicles around the own vehicle through inter-vehicle communications to notice the driver of a risk of collision with one or more of the peripheral vehicles, thereby avoiding an upon-meeting collision at a blind intersection before the collision occurs. Japanese Patent Application Publication No. 2009-081524 discloses such a system.

In the above system, one of the main objects is how to assure validity of communication data. There is known as a solution an electronic signature scheme based on the public key cryptosystem.

In the electronic signature scheme, the communication data is to be transmitted with attached data for the electronic signature (hereinafter, referred to as signature data), thereby enabling the public key to be verified and checking whether or not the communication data has been tampered with by means of a message digest generated by a hash function.

In the electronic signature scheme based on the public key cryptosystem, however, a larger public key is required to assure higher reliability, which leads to larger signature data.

Figure 8:
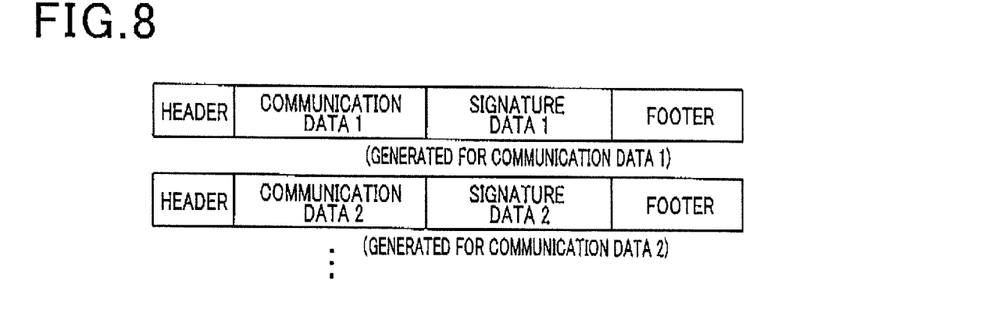
FIG. 8 schematically illustrates a communication frame for use in a conventional communication system.

There exists a following disadvantage in the above scheme. In cases where a relatively small amount of communication data is allowed to be transmitted/received in each communication and is comparable in data amount to the signature data, an overhead for the signature data is increased, which leads to reduction in communication efficiency (see FIG. 8).

In particular, in the above inter-vehicle communication system, regular exchange of data is required. In addition, data to be exchanged (i.e., the vehicle information) in each communication is assumed to be about 100 bytes in size, while the signature data is 200 bytes or more in size. That is, when the signature data is attached to the data to be exchanged, a total amount of data required for each communication will be increased two or three fold.

An amount of data that can be exchanged in each communication (i.e., size of one communication frame) is determined by a baud rate and an allowable number of concurrent communication partners and other conditions.

A radius of an inter-vehicle communication area is here assumed to be 200 m, whose center is located at a traffic intersection of 4 roads each having 3 lanes on one side. Assuming that a plurality of vehicles are running spaced apart from each other with an average inter-vehicle distance of 10 m, there exist 20 vehicles per lane within a 200 m long segment of each road. Therefore, 3 lanes on one side×2 lanes on the other side×4 directions×20 vehicles per lane gives 480 vehicles within the area of 200 m radius, of course, which may depend on a traffic condition.

Assuming that each road is a high-speed way where the vehicle speed is 30 m/sec, and taking into account potential data missing due to communication errors or the like, a data transmission cycle is preferably limited to 100 ms or less such that the data missing effect on the communication control is made allowable. In addition, it may be assumed that the baud rate is around 10 Mbps, but which is depends on an allocated bandwidth of radio waves.

Under such a condition, an amount of data that can be transmitted in each communication can be estimated from the following equation.

$$10 \times 10^6 \text{ [bps]} \times 0.1 \text{ [s]}/480 \text{ [vehicles]} = 2083 \text{ [bits]}$$

That is, even in the absence of transmission loss, the data amount can take nothing more than about 260 bytes. In addition, an increasing packet density leads to significant reduction in communication efficiency due to frequent occurrence of packet collisions. Therefore, it is said that the data amount is actually limited to under about 30% of 260 bytes.

That is, a disadvantage of the above inter-vehicle communication system is that since the signature data is about 200 bytes in size, it is probably impossible to transmit even 100 bytes of data that are originally intended to be transmitted.

In consideration of the foregoing, exemplary embodiments of the present invention are directed to providing a communication system that is capable of preventing significant reduction in throughput of communication data due to the additional signature data.

SUMMARY

In accordance with an exemplary aspect of the present invention, there is provided a communication system for transmitting and receiving communication data together with signature data attached thereto for verifying the communication data.

A transmission-side terminal of the system generates the signature data for each unit of communication data consisting of M (a positive integer such that M>=2 where "X>=Y" for integers X, Y means "X is equal to or more than Y") pieces of communication data to be transmitted, divides the generated signature data into N (a positive integer such that M>=N>=2) pieces of divided signature data, and transmits the N pieces of divided signature data, attached to N corresponding pieces of communication data.

A reception-side terminal of the system reconstitutes each unit of communication data from M pieces of received communication data, reconstitutes the signature data for the reconstituted unit of communication data from N pieces of received divided signature data attached to the received communication data, and verifies the reconstituted unit of communication data on the basis of the reconstituted signature data to thereby verify the communication data of the reconstituted unit of communication data.

In the communication system of this embodiment, the signature data for verifying the unit of communication data are transmitted not in a non-divided form, but in a divided form such that N pieces of divided signature data are transmitted attached to N corresponding pieces of communication data. This can prevent significant increase in data amount of additional data in each communication frame for verifying the communication data.

Consequently, it becomes possible to implement the electronic signature scheme without significantly reducing throughput of the communication data, which enables both the throughput and the security level required for the communication system to be assured.

In one embodiment where the transmission-side terminal generates the signature data for each unit of communication data (M pieces of communication data) and is required to transmit the generated signature data (N pieces of divided signature data) in real time, the signature data (N pieces of divided signature data) are allowed to be transmitted after the unit of communication data for the signature data (or for which the signature data is generated) have been transmitted since the signature data cannot be transmitted in parallel with the unit of communication data for the signature data.

Therefore, on the reception-side terminal, the received unit of communication data and thus the received communication data fail to be verified unless all the N pieces of divided signature data have been received. In one embodiment where the communication data are inhibited to be used before the verification of the receive unit data is completed, it is impossible to use real-time controls and processes that use the communication data inhibited.

In one embodiment preferable for the real-time communications where the communication data to be transmitted by the transmission-side terminal includes a variable value that varies with time under a predetermined condition, the reception-side terminal determines that unverified received communication data is valid if the variable value included in the unverified received communication data is within a predetermined range that is anticipated on the basis of a variable value included in verified received communication data and the predetermined condition. The unverified received communication data are communication data that have not been verified to be valid with the reconstituted signature data, and the verified received so communication data are communication data that has been verified to be valid with the reconstituted signature data.

That is, in the communication system of the above embodiment, when the unverified communication data are consistent with the verified communication data, the unverified communication data may be considered to be valid, which enables the real-time controls and processes to be performed in parallel with the verification of the communication data. Higher security can also be assured.

In one embodiment where the transmission-side terminal and the reception-side terminal are both mounted in each of a plurality of vehicles such that the vehicles can communicate with each other, and the communication data to be generated by the transmission-side terminal includes at least location information indicative of a location of a vehicle in which the transmission-side terminal is mounted, and correction information indicative of whether or not there has been performed location correction in which the location information is corrected to match map information that is prepared in advance, the reception-side terminal considers the location information included in the unverified received communication data to be valid if the correction information indicates that the location information has been corrected, even though the location information (i.e., vehicle location) is out of a predetermined range that is anticipated on the basis of the location information included in the verified received communication data and the predetermined condition.

The predetermined condition may include an upper limit of displacement in vehicle location that can be anticipated on the basis of the vehicle speed and a transmission cycle of the communication data.

When the location information acquired from the autonomous navigation has been corrected by the well-known so map-matching method, the displacement in vehicle location may largely exceed the range that can be anticipated on the basis of the predetermined condition. Therefore, when it has been known that the location information has been corrected, the location information can be exploited without being unnecessarily discarded as abnormal.

DESCRIPTION OF SPECIFIC EMBODIMENTS

The present invention will be described more fully hereinafter with reference to the accompanying drawings. Like numbers refer to like elements throughout.

Figure 1:
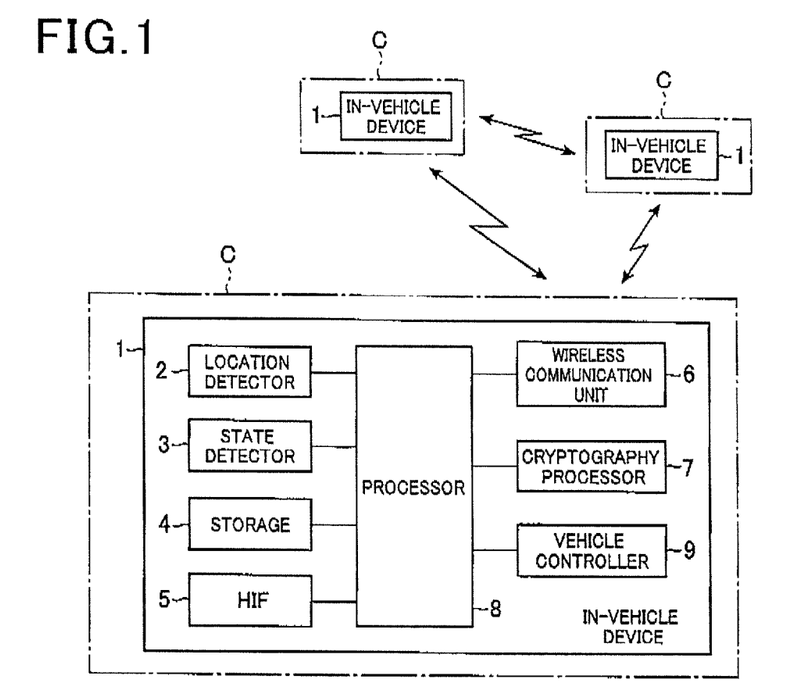
FIG. 1 schematically illustrates a block diagram of a communication system including an in-vehicle device in accordance with one embodiment of the present invention.

FIG. 1 shows a block diagram of a communication system including an in-vehicle device in accordance with one embodiment of the present invention.

As shown in FIG. 1, the communication system of the present embodiment includes a plurality of in-vehicle devices 1 each mounted in a corresponding vehicle C that can wirelessly communicate with each other.

The in-vehicle device 1 of one's own vehicle C exchanges vehicle information of the own vehicle, such as a location, a velocity, an acceleration, an angular velocity, correction information for the location, with other in-vehicle devices 1 of peripheral vehicles C around the own vehicle (e.g., within an area of 200 m radius centered at the own vehicle) through inter-vehicle communications to thereby avoid collisions with the peripheral vehicles.

(Communication Frame)

There will now be explained a communication frame to be transmitted and received in the communication system of the present embodiment with reference to FIG. 2.

Figure 2:
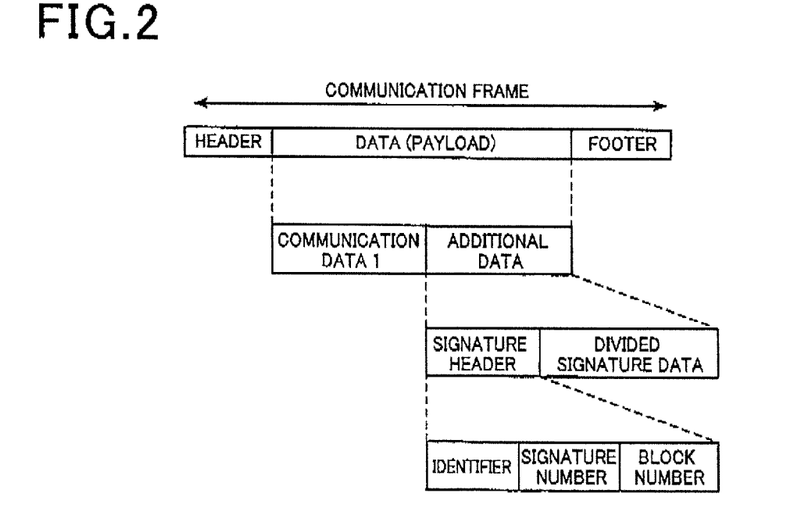
FIG. 2 schematically illustrates a communication frame for use in the communication system.

Each communication frame, as shown in FIG. 2, includes a header, a data portion (payload), a footer. The header and footer are known, and are defined according to a specific communication protocol for use in the communication system. The header includes at least information for identifying a source of the communication frame.

The data portion includes communication data composed of the vehicle information, and additional data used to verify the communication data.

For each frame, the additional data includes a signature header and a piece of divided signature data. M (a positive integer such that m≥2) pieces of divided signature data are obtained by dividing the signature data into M pieces where the signature data is generated for each unit of communication data consisting of M pieces of communication data. This signature header includes information used for reconstituting the original signature data from the M pieces of divided signature data The signature header includes an identifier for identifying a type of signature object (e.g., certificate, data), a signature number k (k=1, 2, . . . ) for identifying which signature data the present divided signature data belongs to, and a block number i (i=1, 2, . . . , M) for indicating where is the present divided signature data in the signature data identified by the signature number k in ascending order.

(In-Vehicle Device)

Referring back to FIG. 1, the in-vehicle device 1 includes a location detector 2 that detects a current location of one's own vehicle, a state detector 3 that detects a vehicle state of the own vehicle by means of various sensors included in the detector 3, such as a velocity sensor, an acceleration sensor, an angular velocity sensor (the location, the velocity, the acceleration, and the angular velocity are (state) variables whose values vary with time, for example, while the own vehicle is running), a storage 4 that stores various information including at least map information, and a human interface (HIF) 5 that includes, for example, a control panel for inputting various instructions from a user, a display for displaying a map and various information, and a speaker for generating a guidance voice or an audible alarm.

The in-vehicle device 1 further includes a wireless communication unit 6 for wirelessly communicating with the other vehicles, a cryptography processor 7 for generating the signature data to verify the communication data to be transmitted via the wireless communication unit 6 and for performing a verifying process to verify the communication data received via the wireless communication unit 6, and a processor 8 for performing various processes using the units 2-7, and a vehicle controller 9 for performing various vehicle controlling processes, such as brake control, according to instructions from the processor 8.

The location detector 2 detects a current location, a current travelling direction and the like of one's own vehicle on the basis of radio waves received from the GPS satellites. Complementarily to the GPS navigation, the location detector 2 also detects the current location, in the so-called autonomous navigation, on the basis of a travelling distance derived from the acceleration, the angular velocity and the like detected by the state detector 3, and a travelling direction derived from outputs of a geomagnetic sensor. It should be noted that the GPS navigation and the autonomous navigation are complementary to each other.

The wireless communication unit 6 broadcasts a communication frame as shown in FIG. 2 to in-vehicle devices 1 of other vehicles C. Specifically, upon reception of data from the processor 8, the wireless communication unit 6 generates and then transmits the communication frame including the data (payload) from the processor 8 and the header and footer attached to the data. On the other hand, upon reception of the communication frame from other in-vehicle devices, the wireless communication unit 6 notifies the processor 8 of the reception of the frame.

The cryptography processor 7 generates signature data including a public key, an electronic certificate for verifying the public key and encrypted data obtained by encrypting a message digest of the communication data to be transmitted with a private key, and further performs first and second verifying processes. In the first verifying process, the cryptography processor 7 verifies the public key by using the electronic certificate. In the second verifying process, the cryptography processor 7 verifies the communication data (i.e., checks whether or not the communication data has been tampered with) by comparing a message digest obtained by decrypting the encrypted data with the public key that has been verified to be valid in the first verifying process with a message digest extracted from the received communication data The processor 8 may be a known microcomputer including a CPU, a ROM, a RAM, and performs as a navigation device, according to instructions inputted via the HIF 5, a navigation-related process for setting or establishing a traveling path and then displaying or guiding the set traveling path, using a current location detected by the location detector 2 of the own vehicle and map information stored in the storage 4. In addition, the processor 8 performs a transmitting process for transmitting the vehicle information of the own vehicle (hereinafter, referred to as "own-vehicle information") via the wireless communication unit 6 and a receiving process for receiving the vehicle information of the other vehicles (hereinafter, referred to as "other-vehicle information") via the wireless communication unit 6, and then estimating a degree of a collision risk with the other vehicles on the basis of the own-vehicle information and the other-vehicle information.

The navigation-related process includes a location information correcting (map-matching) process where the processor 8 acquires location information from the location detector 2 regularly or periodically, compares the acquired information with the map information stored in the storage 4, and then corrects the location information such that the own vehicle is positioned on a road of the map.

Figure 3:
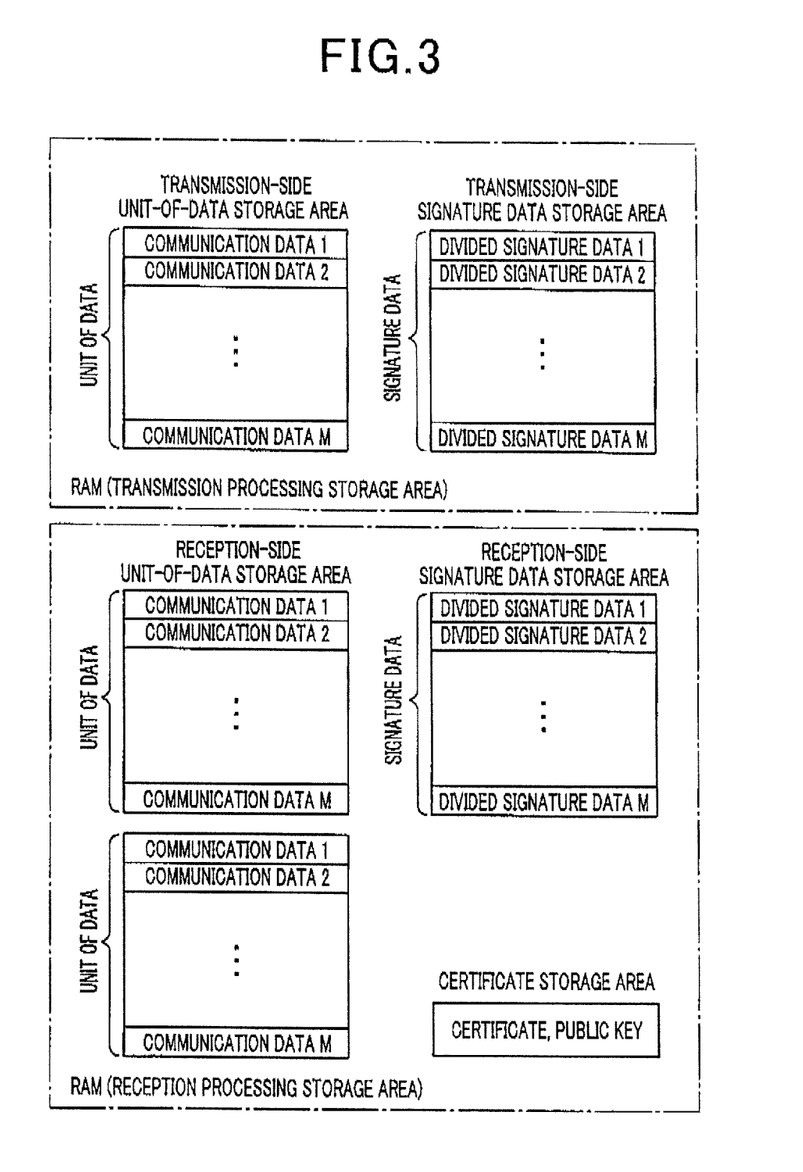
FIG. 3 schematically illustrates storage areas for various kinds of data.

As shown in FIG. 3, the RAM of the processor 8 has a transmission processing storage area and a reception processing storage area(s) reserved therein.

The transmission processing storage area includes a transmission-side unit of communication data storage area for storing a unit of communication data consisting of M pieces of communication data to be transmitted, and a transmission-side signature data storage area for storing the signature data generated by the cryptography processor 7 for the unit of communication data. The transmission-side signature data storage area has M blocks for successively storing M pieces of divided signature data.

That is, the transmission-side unit of communication data storage area includes M blocks for successively storing M pieces of communication data where the M pieces of communication data forms one unit of communication data, and the transmission-side signature data storage area includes M blocks for successively storing M pieces of divided signature data where the M pieces of divided signature data forms one piece of signature data generated for the unit of communication data.

The wireless communication unit 6 reserves in the RAM one reception processing storage area for each of a maximum number of concurrent communication partners (hereinafter, referred to as an "allowable communication number"). Each reception processing storage area includes two reception-side unit of communication data storage areas each similar to the transmission-side unit of communication data storage area, one reception-side signature data storage area similar to the transmission-side signature data storage area, and a certificate storage area for storing a public key that has been verified to be valid by the cryptography processor 7 and an electronic certificate for the public key.

(Transmitting Process)

Figure 4:
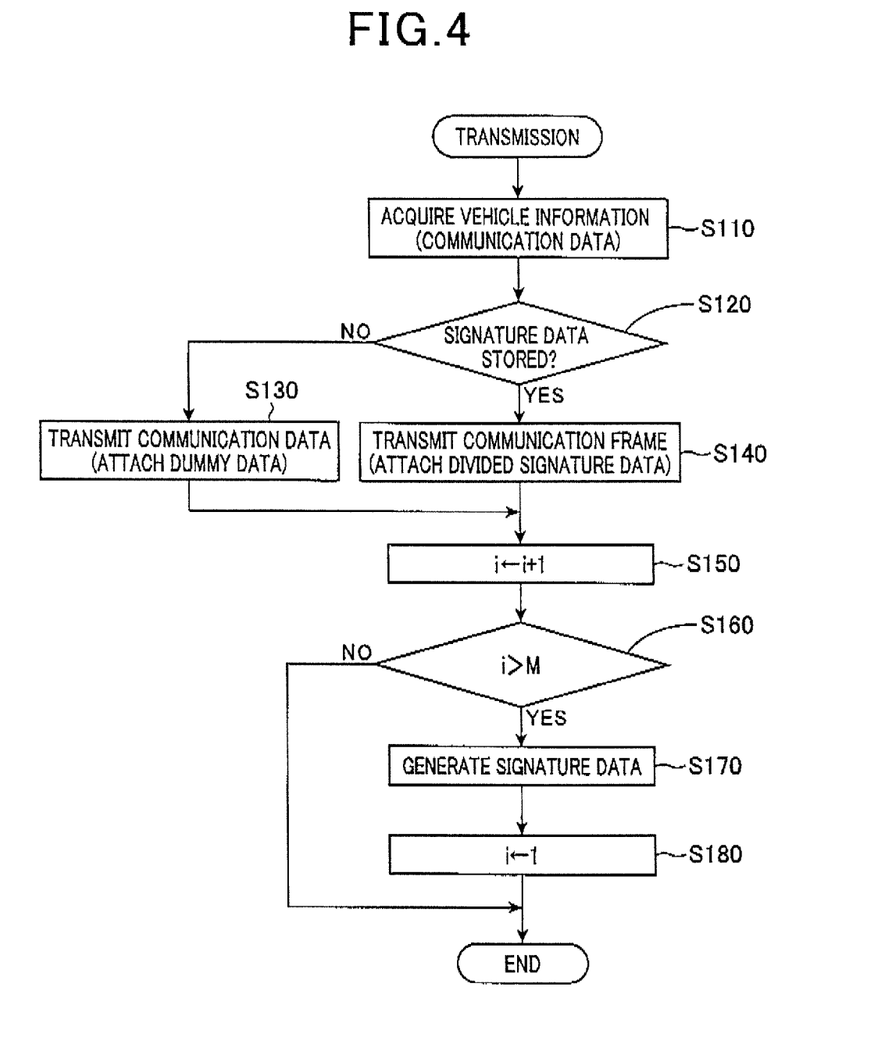
FIG. 4 schematically illustrates a flowchart of a transmitting process performed by a processor in the in-vehicle device.

There will now be explained a transmitting process to be performed by the CPU of the processor 8 with reference to a flowchart in FIG. 4.

The transmitting process is repeatedly started at a fixed time interval (in the present embodiment, 100 ms) while the engine is running. Before the first start of the transmitting process, the parameter i for use in the process shall be initialized to 1.

Each time the process is started, the processor 8 acquires the vehicle information (in the present exemplary embodiment, a location, a velocity, an acceleration, an angular velocity, and correction information of the own vehicle) from the location detector 2 and the state detector 3, generates communication data from the vehicle information, and then stores the generated communication data in the i-th block of the transmission-side unit of communication data storage area at step S110.

Subsequently, at step S120, it is determined by the processor 8 whether or not signature data for transmission is stored in the transmission-side signature data storage area.

If the signature data is not stored in the transmission-side signature data storage area, the process proceeds to step S130, where the communication data acquired at step S110 will be transmitted together with dummy data (that is prepared in advance) attached thereto via the wireless communication unit 6. The process proceeds to step S150. Since M pieces of communication data are required to generate the signature data, there is no signature data for transmission stored (or there are dummy data stored) in the transmission-side signature data storage area during a time period from the first start to the M-th start of the transmission process (i.e., during a time period T0-T1).

If the signature data is stored in the transmission-side signature data storage area, the process proceeds to step S140, where the communication data acquired at step S110 and the additional data generated from the divided signature data stored in the i-th block in the transmission-side signature data storage area will be transmitted via the wireless communication unit 6. The process then proceeds to step S150. Since the communication frame is to be transmitted immediately after the steps S130, S140 for each transmitting process, the communication frame transmission cycle substantially coincides with the start cycle of the process.

At step S150, the parameter i is incremented (i←i+1). Then at step S160, it is determined whether or not the parameter i is larger than M where M is a division number of the signature data. If the parameter i is equal to or less than M, it is determined that a full set of M pieces of communication data required for generating signature data have not been prepared yet, and then the process is immediately ended.

If the parameter i is larger than M, it can be considered that a full set of M pieces of communication data required to generate signature data has been prepared, and then the process proceeds to step S170, where the signature data is generated by the cryptography processor 7 for a unit of communication data consisting of M pieces of communication data stored in the transmission-side unit of communication data storage area. The generated signature data will be stored in the transmission-side signature data storage area.

At the next step S180, the parameter i is initialized to 1, and then the process is ended.

Figure 5:
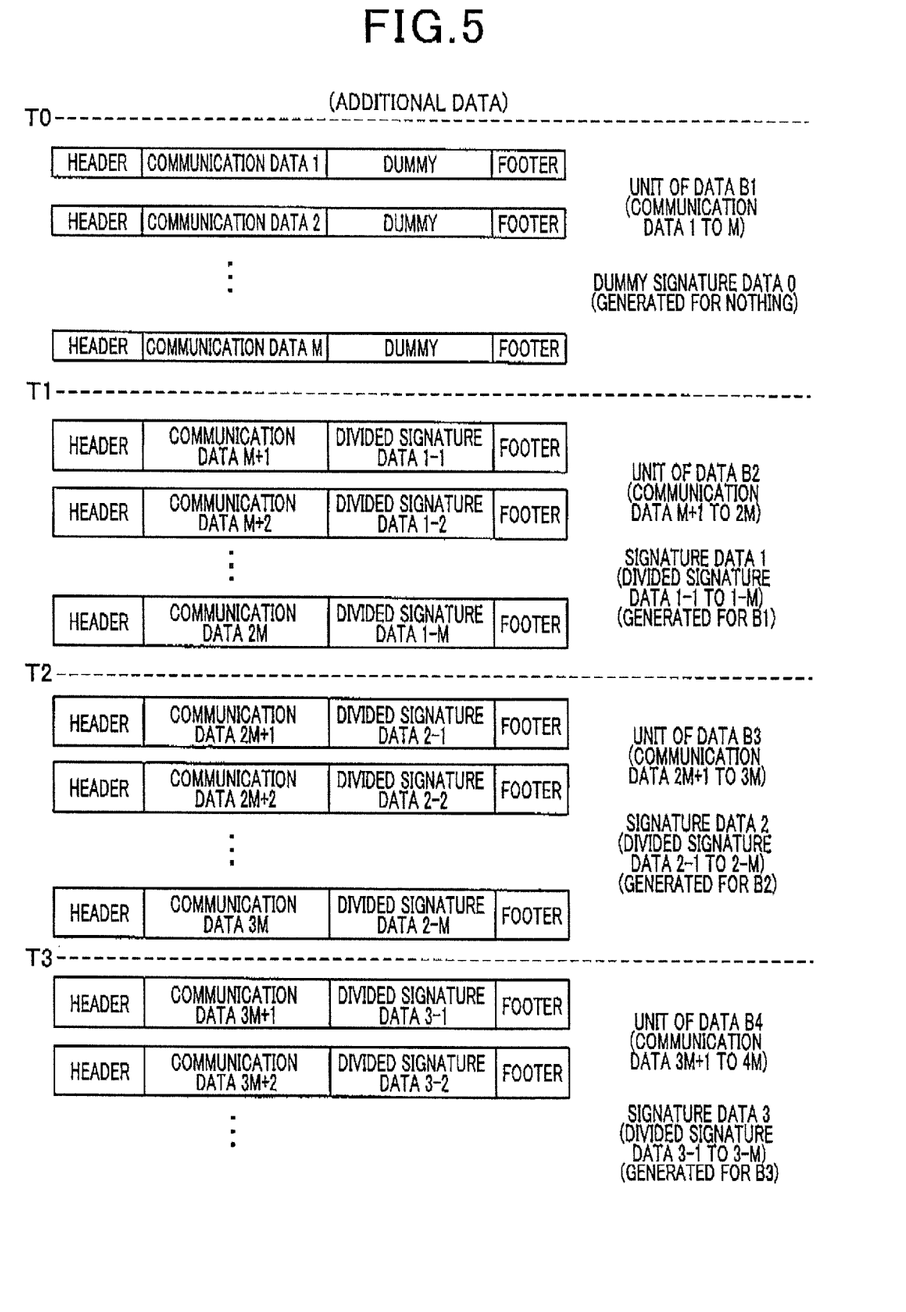
FIG. 5 schematically illustrates communication frames to be generated in the transmitting process.

FIG. 5 schematically illustrates communication frames to be transmitted in each transmitting process.

As shown in FIG. 5, when the transmitting process is first started (T0), no signature data is stored in the transmission-side signature data storage area. Therefore, dummy data will be attached to the first to M-th communication frames (communication data 1-M in FIG. 5) until the first signature data 1 is generated (T0-T1).

After the transmission of the M-th communication frame (T1), the signature data 1 is generated for the M pieces of communication data 1 to M forming one unit of communication data. The generated signature data 1 for the unit of communication data is stored in the transmission-side signature data storage area in a divided form. Accordingly, M pieces of divided signature data 1-1 to 1-M obtained by dividing the signature data 1 into M pieces will be successively attached to the (M+1)-th to the 2M-th communication frames (communication data M+1 to 2M) until the subsequent signature data 2 is generated (T1-T2).

Similarly, in subsequent transmitting processes, M pieces of divided signature data k–1 to k–M, which are obtained by dividing the signature data k into M pieces, will be successively transmitted, attached to (k·M+1)-th to (k+1)·M-th communication frames (k=0, 1, 2, . . . ).

(Receiving Process)

Figure 6:
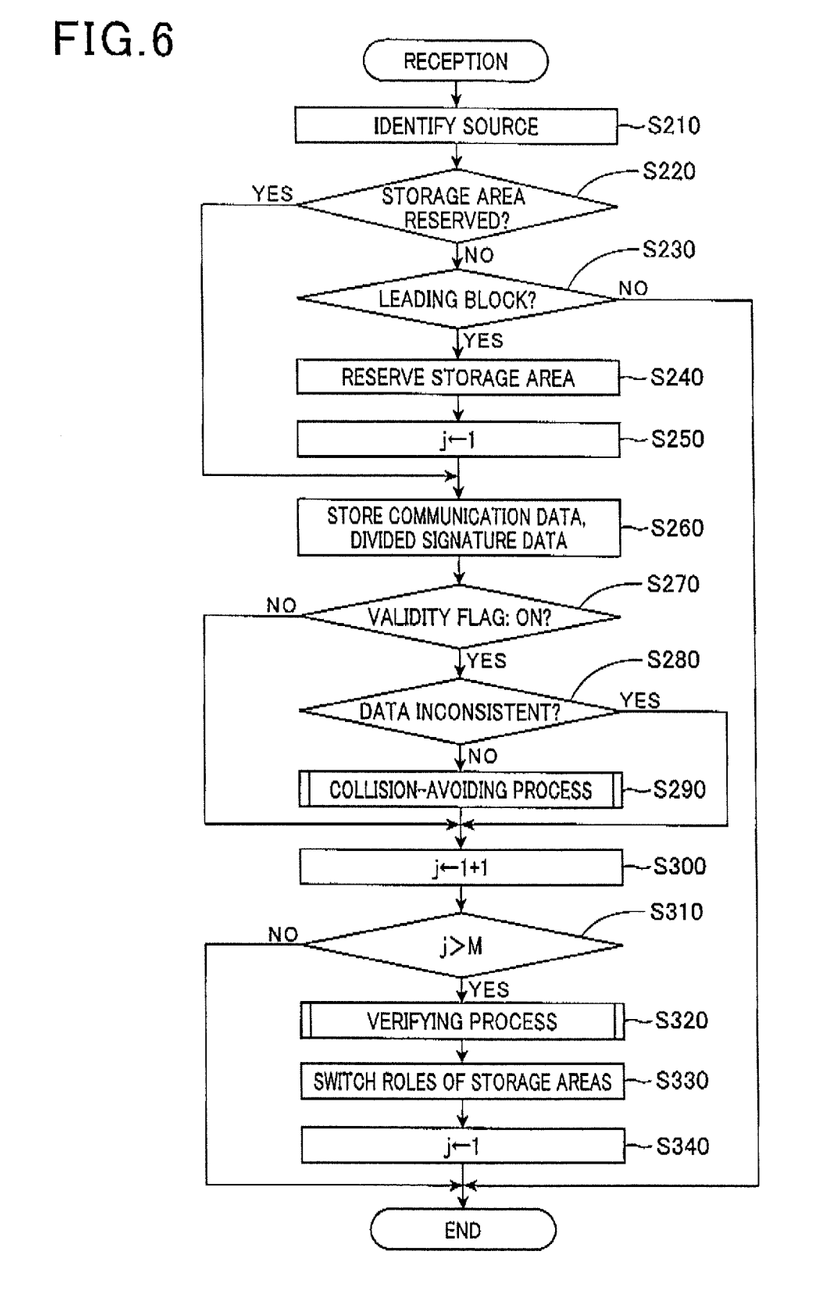
FIG. 6 schematically illustrates a flowchart of a receiving process performed by the processor in the in-vehicle device.

There will now be explained a receiving process to be performed by the CPU of the processor 8 with reference to a flowchart in FIG. 6.

The process is started each time the communication frame is received by the in-vehicle device 1 while the vehicle engine is running. A validity flag, which indicates whether or not the received communication data has been verified to be valid with the signature data, is used in the process, and the flag is set to ON/OFF in the verifying process which will be described later. Before the receiving process is started for the first time, the validity flag shall be set to OFF (unverified).

Once the process is started, the processor 8 identifies a source of the received communication frame from the header at step S210, and then at step S220 determines whether or not the reception processing storage area has been reserved for the identified source (hereinafter, referred to as a "communication partner"). If not reserved, the process proceeds to step S230. If reserved, the process proceeds to step S260.

At step S230, referring to information in this signature header (the block number) of the additional data, the processor 8 determines whether or not the received communication data and so the received divided signature data come from the corresponding leading blocks for the unit of communication data and the signature data. If not, the process is immediately ended, and then the received communication data and the received additional data will be discarded.

If the received communication data and the received divided signature data come from the corresponding leading blocks for the unit of communication data and the signature data, the processor 8 reserves a reception processing storage area for the communication partner at step S240, and then at step S250 initializes the parameter j to 1. The parameter j is used to specify a block in each of the reception-side unit of communication data storage area and the reception-side signature data storage area. The process proceeds to step S260.

In the following, the reception-side unit of communication data storage area and the reception-side signature data storage shall refer to the reception-side unit of communication data storage area and the reception-side signature data storage area in the reception processing storage area reserved for the communication partner identified as a source at step S210.

At step S260, the processor 8 stores the received communication data in the j-th block of the reception-side unit of communication data storage area, and stores the divided signature data included in the received additional data in the j-th block of the reception-side signature data storage area.

Subsequently, it is checked whether or not the validity flag is ON at step S270. If the flag is ON, the process proceeds to step S280. If the flag is OFF, the process proceeds to step S300.

At step S280, it is checked whether or not the received communication data is consistent. Specifically, it is determined that the received communication data is consistent if a displacement between location information included in the received communication data (in particular, the vehicle information) and location information included in the latest received communication data that has been already verified to be valid with the signature data is within a predetermined, anticipated range. If the displacement is out of the anticipated range, it is determined that the received communication data is inconsistent. However, if the correction information included in the received communication data (unverified) indicates that the location information has been corrected, it may be considered that the received communication data is consistent even if the displacement is out of the anticipated range.

The anticipated range may be variably set according to the vehicle speed of the communication partner and the transmission cycle of the communication frame and the like.

If it is determined that the received communication data is inconsistent, the process proceeds to step S300. If it is determined that the communication data is consistent, the process proceeds to step S290, where the processor 8 estimates a risk of collisions with other vehicles on the basis of the received communication data (in particular, the vehicle information), and then performs on the basis of the estimation a collision-avoiding process to avoid potential collisions in which various controlling operations, such as alarm generation, automatic braking or the like, are performed. The process then proceeds to step S300.

At step S300, the parameter j is incremented (j←j+1). Then at step S310, it is determined whether or not the parameter j is larger than M where each unit of communication data consists of M pieces of communication data (M is also the division number of the signature data). If the parameter j is equal to or less than M, it is determined that the unit of communication data has not been yet reconstituted from M pieces of received communication data and the signature data also has not been yet reconstituted from M pieces of received divided signature data. The process is then immediately ended.

If the parameter j is larger than M, it may be considered that that the unit of communication data has been already reconstituted from M pieces of received communication data and the signature data also has been already reconstituted from M pieces of received divided signature data. The process then proceeds to step S320, where the verifying process is performed by the cryptography processor 7 using the reconstituted signature data stored in the reception-side signature data storage area and the reconstituted unit of communication data stored in the reception-side unit of communication data storage area that is not currently selected to store the communication data.

Subsequently, at step S330, the reception-side unit of communication data storage area that has the reconstituted unit of communication data to be used in the verifying process at step S320 stored therein is next selected to store the received communication data. At the step S340, the parameter j is initialized to 1, and then the process is ended.

In other words, the subsequently received communication data will be stored in the next selected one of the two reception-side unit of communication data storage areas, and the subsequently received divided signature data will be stored in the reception-side signature data storage area.

The verifying process is performed each time the unit of communication data is reconstituted from M successive stored pieces of received communication data and the signature data is reconstituted from M successive stored pieces of received divided signature data. It should be noted that the unit of communication data to be used in the verifying process comes not from the latest received unit of communication data, but from previously received unit of communication data that has been stored in the non-currently-selected one of the two reception-side unit of communication data storage areas.

As shown in FIG. 5, at the time T1, the unit of communication data B1 (communication data 1-M) have been stored in the selected one of the two reception-side unit of communication data storage areas that is currently selected to store the communication data, while no data is stored in the non-selected one of the two reception-side unit of communication data storage areas. In addition, there are stored dummy data in the reception-side signature data storage area. Therefore, since there is no signature data at the time T1, the verifying process cannot be performed.

Subsequently, at the time T2, the unit of communication data B2 (communication data M+1 to 2M) have been stored in the selected one of the two reception-side unit of communication data storage areas that is currently selected to store the communication data, and the unit of communication data B1 (communication data 1 to M) have been already stored in the non-selected one of the two reception-side unit of communication data storage areas. In addition, the signature data 1 (divided signature data 1-1 to 1-M) for the unit of communication data B1 has been stored in the reception-side signature data storage area. Therefore, at the time T2, the verifying process can be performed for the reconstituted unit of communication data B1 by using the reconstituted signature data 1.

The data verified at the time T2 are the communication data 1 to M received during a time period T0-T1. The communication data M+1 to 2M received during a time period T1-T2 will be left unverified in the non-selected one of the two reception-side unit of communication data storage areas until the time T3 at which verification of the communication data M+1 to 2M becomes possible.

The reception processing storage area may be open to being used to store the communication data from the other vehicles unless the reception processing storage area is accessed to store data by a separate process other than the receiving process during a predetermined maximum time period.

(Verifying Process)

Figure 7:
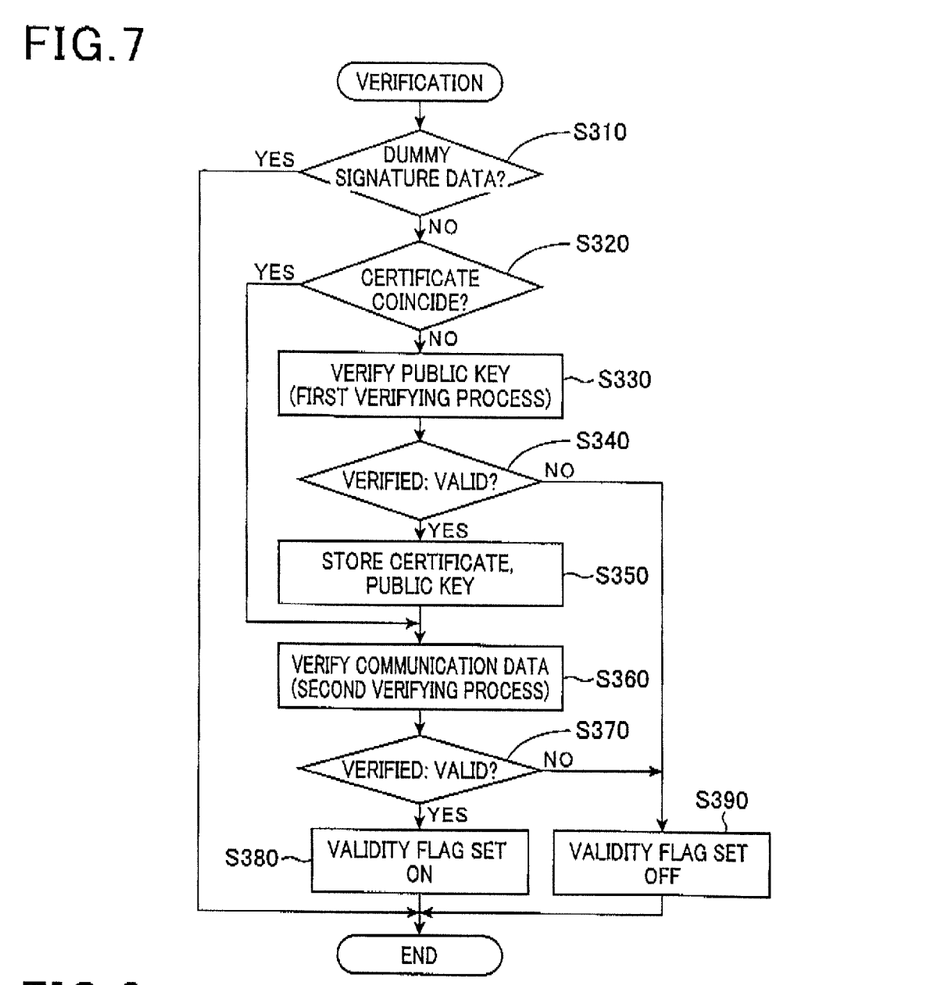
FIG. 7 schematically illustrates a flowchart of a verifying process in the receiving process.

There will now be explained the verifying process to be performed at step S320 with reference to a flowchart in FIG. 7.

When the process is started, it is determined at step S310 whether or not the reconstituted signature data is dummy data. If the reconstituted signature data is dummy data, the process is immediately ended.

If the reconstituted signature data is not dummy data, the process proceeds to step S320, where it is determined whether or not the electronic certificate extracted from the reconstituted signature data coincides with the electronic certificate that is stored in the certificate storage area. If the electronic certificate from the reconstituted signature data coincides with the electronic certificate from the certificate storage area, the subsequent operation at step S360 is performed using the public key stored in the certificate storage area together with the electronic certificate for the public key.

If it is determined at step S320 that the electronic certificate extracted from the reconstituted signature data doesn't coincide with the electronic certificate that is stored in the certificate storage area, the first verifying process for verifying the public key extracted from the reconstituted signature data is performed by the cryptography processor 7 using the electronic certificate extracted from the reconstituted signature data.

Subsequently at step S340, if the public key fails to be verified in the first verifying process by the cryptography processor 7, the process proceeds to step S390, where the validity flag is set to OFF. The process is then ended.

On the other hand, if the public key is successfully verified at step S340, the process proceeds to step S350, where the electronic certificate and the verified public key both extracted from the reconstituted signature data are stored in the certificate storage area. The process then proceeds to step S360.

At step S360, the second verifying process for verifying the received communication data is performed by the cryptography processor 7, where the encrypted data extracted from the reconstituted signature data is decrypted using the public key verified in the first verifying process, and then the decrypted message digest is compared with the message digest generated from the received communication data (actually, the unit of communication data).

Subsequently at step S370, if the communication data is successfully verified in the second verifying process by the cryptography processor 7, the validity flag is set to ON at step S380. The process is then ended. If the communication data fails to be verified, the validity flag is set to OFF at step S390. The process is then ended.

Referring to FIG. 5, for example, if the communication data 1 to M are not verified to be valid at the time T2, the validity flag will remain OFF before the time T3 is reached. Therefore, the communication data 2M+1 to 3M will not be used in the collision-avoiding process (S290). If the communication data M+1 to 2M are verified to be valid at the time T3, the communication data 3M+1 to 4M received during a time period T3-T4 may be regarded as valid data provided that the communication data 3M+1 to 4M are consistent with the latest verified communication data 2M. Therefore, the communication data 3M+1 to 4M may be used in the collision-avoiding process (S290).

As described above, in the communication system in accordance with the above embodiment, the in-vehicle device 1 on the transmission side generates signature data for each unit of communication data consisting of M pieces of communication data to be transmitted, divides the generated signature data into M pieces of divided signature data, and successively transmits the M pieces of divided signature data, attached to successive pieces of communication data.

On the other hand, the in-vehicle device 1 on the reception side reconstitutes each unit of communication data from M pieces of received communication data, reconstitutes the signature data for the reconstituted unit of communication data from M pieces of received divided signature data (each extracted from received additional data), and verifies the reconstituted unit of communication data on the basis of the reconstituted signature data to thereby verify the communication data of the reconstituted unit of communication data.

In this way, in the communication system in accordance with the present embodiment, the signature data for verifying the unit of communication data are transmitted not in a non-divided form, but in a divided form where the signature data is divided into M pieces to be transmitted, attached to the communication data. This can prevent significant increase in data amount of additional data in each communication frame for verifying the communication data.

Consequently, it becomes possible to implement the electronic signature scheme without significantly reducing throughput of the communication data, which enables both the throughput and the security level required for the communication system to be assured.

For example, given the communication data of 100 bytes, the signature data of 200 bytes (the certificate of 100 bytes, the electronic signature of 100 bytes), the number of pieces of communication data that constitute the unit of communication data (=the division number of signature data) M=10, the signature header of 2 bytes (the identifier of 4 bits, the signature number of 4 bits, the block number of 8 bits), the additional data accounts for 22 bytes (the divided signature data of 20 bytes, the signature header of 2 bytes).

That is, under this condition, it is possible not only to reduce the additional data from 200 bytes to 22 bytes in size for each communication frame, but also to significantly reduce a processing load required for the verifying process because the verifying process only has to be performed once every 10 successive received communication frames.

In addition, the reception-side in-vehicle device 1 determines that the received communication data that is unverified with the reconstituted signature data is consistent if a displacement between location information included in the unverified communication data and location information included in the latest verified (to be valid) communication data is within a predetermined, anticipated range. If the unverified communication data is consistent, then the reception-side in-vehicle device 1 is allowed to use the unverified communication data in the collision-avoiding process.

Therefore, the in-vehicle device 1 of the present embodiment can control itself in real time on the basis of the unverified non-abnormal communication data.

In addition, in the in-vehicle device 1 of the present embodiment, if the correction information indicates that the location information has been corrected, then it may be considered that the communication data is consistent even if the displacement is out of the anticipated range. This enables actually normal received communication data to be exploited without being unnecessarily discarded as abnormal.

At the time when communication with the in-vehicle device 1 of the communication partner is started, the own vehicle is substantially spaced apart from the vehicle of the communication partner with a certain distance (approximately, a radius of the coverage area of the wireless communication unit 6, e.g., around 200 m). Therefore, even after a time period from the start of reception of communication data from the communication partner's vehicle to the completion of the first verification of received communication data has elapsed after the start of reception, a risk of collision between the own vehicle and the communication partner's vehicle remains low.

Other Embodiments

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

In the embodiments disclosed above, the division number of the signature data is equal to the number of pieces of communication data that constitute the unit of communication data (M). Alternatively, the division number of the signature data may be N that is less than M (M>N>=2). In this embodiment, a time period from the start of reception of communication data from the communication partner to the completion of verification of the received communication data by the reconstituted signature data can be reduced.

In the embodiments disclosed above, the cryptography processor 7 is adapted to perform the first verifying process (S330) and the second verifying process (S360). Alternatively, the cryptography processor 7 may be adapted to perform all the verifying processes.

In the embodiments disclosed above, the in-vehicle device 1 serves as a transceiver. Alternatively, the in-vehicle device 1 may serve as either one of a transmitter and a receiver.

In the embodiments disclosed above, the inter-vehicle communication system has been described. However, the invention is applicable to any communication system that attaches additional data for verifying the communication data to the communication data, and transmits and receives the communication data together with the additional data attached thereto.

What is claimed is:

1. A communication system for transmitting and receiving communication data together with signature data attached thereto for verifying the communication data, the system comprising:
   a transmission-side terminal that, each time M (a positive integer that is greater than or equal to 2; M>=2) pieces of communication data constituting one unit of communication data are transmitted, generates the signature data for the one unit of communication data consisting of M pieces of communication data lastly transmitted, divides the generated signature data into M pieces of divided signature data, and then sequentially transmits the M pieces of divided signature data, attached to M corresponding pieces of communication data, wherein each of the M pieces of divided signature data is transmitted, attached to a corresponding piece of communication data, each time the corresponding piece of the communication data is generated; and
   a reception-side terminal that, each time the M pieces of communication data constituting the one unit of communication data are received from the transmission-side terminal, reconstitutes the one unit of communication data from the M pieces of communication data received previous to the M pieces of communication data last received, reconstitutes the signature data from the M pieces of divided signature data attached to the M corresponding pieces of communication data constituting the one unit of communication data last received, and verifies the reconstituted one unit of communication data by using the reconstituted signature data.

2. The system of claim 1, wherein
   the transmission-side terminal is mounted in a first vehicle and the reception-side terminal is mounted in a second vehicle,
   the communication data transmitted by the transmission-side terminal includes at least location information indicative of a location of the first vehicle, and
   the reception-side terminal determines that unverified received communication data received from the transmission-side terminal is assumed to be valid when a displacement in location of the first vehicle from the location indicated by the location information included in the last verified received communication data to the location indicated by the location information included in the unverified received communication data is within a range that is anticipated on the basis of the location information included in the last verified received communication data and a predetermined condition.

3. The system of claim 2, wherein
   the communication data transmitted by the transmission-side terminal further includes correction information indicative of whether or not there has been performed location correction in which the location information is corrected so as to match previously prepared map information, and
   the reception-side terminal considers the location information included in the unverified received communication data to be valid when the correction information indicates that the location information has been corrected, even if the displacement in location of the first vehicle is out of the anticipated range.

4. A transmitter for use in a communication system for transmitting and receiving communication data together with signature data attached thereto for verifying the communication data,
   the transmitter comprising:
   signature data generating means for, each time M (a positive integer such that M>=2, i.e., M is equal to or greater than 2) pieces of communication data constituting one unit of communication data are transmitted, generating the signature data for the one unit of communication data consisting of M pieces of communication data lastly transmitted;
   signature-data dividing means for dividing the generated signature data into M pieces of divided signature data; and
   transmitting means for transmitting the M pieces of divided signature data, attached to M corresponding pieces of communication data, such that each of the M pieces of divided signature data is transmitted, attached to a corresponding piece of communication data, each time the corresponding piece of the communication data is generated, wherein
   the transmitter is mounted in a vehicle, and
   the communication data includes at least location information indicative of a location of the vehicle, and correction information indicative of whether or not there has been performed location correction in which the location information is corrected so as to match previously prepared map information.

5. The transmitter of claim 4, further comprising data generating means for generating the communication data in the form of a communication frame repeatedly every fixed time interval,
   wherein the transmitting means is adapted to transmit the communication data each time the communication data is generated by the data generating means.

6. A receiver for use in a communication system for transmitting and receiving communication data together with signature data attached thereto for verifying the communication data, wherein,
   each time M (a positive integer that is greater than or equal to 2; M>=2) pieces of communication data constituting one unit of communication data are transmitted, the signature data is generated for the one unit of communication data consisting of M pieces of communication data lastly transmitted, and is divided into M pieces of divided signature data, and the M pieces of divided signature data are sequentially transmitted, attached to M corresponding pieces of communication data, wherein each of the M pieces of divided signature data is transmitted, attached to a corresponding piece of communication data, each time the corresponding piece of the communication data is generated, the receiver comprising:

receiving means for receiving the communication data together with the divided signature data attached thereto, the received communication data including at least location information indicative of a location of a first vehicle, the receiver being mounted in a second vehicle;

communication data reconstituting means for, each time M pieces of communication data constituting the one unit of communication data are received, reconstituting the one unit of communication data from the M pieces of communication data received previous to the M pieces of communication data constituting the one unit of communication data last received;

signature-data reconstituting means for reconstituting the signature data from the M pieces of divided signature data attached to the M corresponding pieces of communication data constituting the one unit of communication data last received;

verifying means for verifying the reconstituted one unit of communication data by using the reconstituted signature data; and determining means for determining that unverified received communication data is assumed to be valid when a displacement in location of the first vehicle from the location indicated by the location information included in the last verified received communication data to the location indicated by the location information included in the unverified received communication data is within a range that is anticipated on the basis of the location information included in the last verified received communication data and a predetermined condition.

7. The receiver of claim 6, wherein the signature data comprises an electronic certificate for verifying a public key, and encrypted data obtained by encrypting a message digest of the one unit of communication data with a private key corresponding to the public key, the verifying means comprising:

first processing means for verifying the public key with the electronic certificate;

second processing means for verifying the reconstituted one unit of communication data by using the message digest obtained by decrypting the encrypted data extracted from the reconstituted signature data with the public key verified to be valid by the first processing means;

storing means for storing the public key verified to be valid by the first processing means and the electronic certificate for the verified public key; and inhibiting means for inhibiting the first processing means from verifying the public key with the electronic certificate when the electronic certificate included in the reconstituted signature data coincides with the electronic certificate stored by the storing means.

8. The receiver of claim 6, wherein the received communication data further includes correction information indicative of whether or not there has been performed location correction in which the location information is corrected so as to match previously prepared map information, and the determining means determines that the location information included in the unverified received communication data is valid when the correction information indicates that the location information has been corrected, even if the displacement in location of the first vehicle is out of the anticipated range.

9. A transceiver for use in a communication system for transmitting and receiving communication data together with signature data attached thereto for verifying the communication data, the transceiver comprising:

signature data generating means for, each time M (a positive integer that is greater than or equal to 2; M>2) pieces of communication data constituting one unit of communication data are transmitted, generating the signature data for the one unit of communication data consisting of M pieces of communication data lastly transmitted;

signature-data dividing means for dividing the generated signature data into M pieces of divided signature data; and transmitting means for transmitting the M pieces of divided signature data, attached to M corresponding pieces of communication data, such that each of the M pieces of divided signature data is transmitted, attached to a corresponding piece of communication data, each time the corresponding piece of the communication data is generated, and the transceiver further comprising:

receiving means for receiving the communication data together with the divided signature data attached thereto;

communication data reconstituting means for, each time M pieces of communication data constituting the one unit of communication data are received, reconstituting the one unit of communication data from the M pieces of communication data received previous to the M pieces of communication data constituting the one unit of communication data last received;

signature-data reconstituting means for reconstituting the signature data from M pieces of divided signature data attached to the M corresponding pieces of communication data constituting the one unit of communication data last received; and verifying means for verifying the reconstituted one unit of communication data by using the reconstituted signature data.

10. The system of claim 2, wherein the predetermined condition comprises an upper limit of displacement in location of the first vehicle.

11. The system of claim 6, wherein the predetermined condition comprises an upper limit of displacement in location of the first vehicle.

12. The transceiver of claim 9, further comprising data generating means for generating the communication data in the form of a communication frame repeatedly every fixed time interval, wherein the transmitting means is adapted to transmit the communication data each time the communication data is generated by the data generating means.

* * * * *